(12) United States Patent
Kim et al.

(10) Patent No.: US 8,986,832 B2
(45) Date of Patent: Mar. 24, 2015

(54) OPTICAL-MODULATION OBJECT

(75) Inventors: Yeon Soo Kim, Gyeonggi-do (KR); Deog Jae Jo, Gyeonggi-do (KR); Jin Soo Kim, Seoul (KR); Do Hyun Kim, Gyeonggi-do (KR); In Young Yang, Daejeon (KR)

(73) Assignee: Woongjin Chemical Co., Ltd., Gyeongsangbuk-Do (KR)

( * ) Notice: Subject to any disclaimer, the term of this patent is extended or adjusted under 35 U.S.C. 154(b) by 867 days.

(21) Appl. No.: 12/693,495

(22) Filed: Jan. 26, 2010

(65) Prior Publication Data

US 2010/0196693 A1 Aug. 5, 2010

(30) Foreign Application Priority Data

Jan. 30, 2009 (KR) .................. 10-2009-0007641
Jan. 30, 2009 (KR) .................. 10-2009-0007643

(51) Int. Cl.
*D02G 3/00* (2006.01)
*D03D 15/00* (2006.01)
*G02B 5/30* (2006.01)
*B32B 5/02* (2006.01)
*B32B 27/12* (2006.01)
*D01D 5/36* (2006.01)

(52) U.S. Cl.
CPC ............... *G02B 5/3083* (2013.01); *B32B 5/02* (2013.01); *B32B 27/12* (2013.01); *D01D 5/36* (2013.01); *D10B 2401/20* (2013.01)
USPC ............ 428/373; 428/364; 442/198; 442/201

(58) Field of Classification Search
USPC ................ 428/292.1, 364, 373; 442/198, 201
See application file for complete search history.

(56) References Cited

U.S. PATENT DOCUMENTS

| | | | | |
|---|---|---|---|---|
| 4,370,114 A | * | 1/1983 | Okamoto et al. | 425/463 |
| 5,471,553 A | * | 11/1995 | Teshima | 385/125 |
| 6,188,824 B1 | * | 2/2001 | Teshima | 385/126 |
| 6,529,665 B1 | * | 3/2003 | Yamashita et al. | 385/124 |
| 2005/0141834 A1 | * | 6/2005 | Murofushi | 385/123 |
| 2005/0232561 A1 | * | 10/2005 | Murofushi et al. | 385/125 |
| 2006/0193577 A1 | * | 8/2006 | Ouderkirk et al. | 385/115 |
| 2007/0230883 A1 | * | 10/2007 | Hart et al. | 385/123 |
| 2010/0135622 A1 | * | 6/2010 | Sasho et al. | 385/102 |

* cited by examiner

*Primary Examiner* — Jeremy R Pierce
(74) *Attorney, Agent, or Firm* — Alston & Bird LLP

(57) ABSTRACT

Disclosed is an optical-modulation object, including birefringent island-in-the-sea yarns, whose island portions are grouped, based on two or more spinning cores, in a matrix. The optical-modulation object causes formation of an optical modulation interface between island portions and sea portions, thus maximizing optical modulation efficiency, as compared to conventional birefringent island-in-the-sea yarns.

26 Claims, 8 Drawing Sheets

OPTICAL-MODULATION OBJECT

CROSS REFERENCE TO RELATED APPLICATIONS

This application claims the benefit under 35 U.S.C. §119 (a) of Korean Patent Application Serial No. 10-2009-0007641, filed Jan. 30, 2009, and Korean Patent Application Serial No. 10-2009-0007643, filed Jan. 30, 2009, both of which are incorporated herein by reference in their entirety.

BACKGROUND OF THE INVENTION

1. Technical Field

The present invention relates to an optical-modulation object, and more specifically, to an optical-modulation object in which birefringent island-in-the-sea yarns having two or more spinning cores are present in a matrix, to considerably reduce production costs and remarkably increase luminance.

2. Background Art

Optical-modulation objects comprise an inclusion dispersed in a continuous matrix, which are well-known in the art and are widely utilized in a variety of optical devices and liquid crystal displays, etc., requiring optical modulation. By modulating the characteristics of inclusions, a predetermined range of reflectivity and transmittance can be imparted to optical-modulation objects. These characteristics include the size of inclusions in an object relative to a wavelength, the shape and arrangement of inclusions, volume ratio of inclusions and mismatch levels in refractive index between an object and a matrix continuously arranged along three rectangular axes, etc.

Common absorptive polarizers comprise inorganic blocked chains containing light-absorbing iodine arranged in a polymer matrix as an inclusion thereof. Such a film absorbs light polarized according to its electric field vectors arranged parallel to blocked iodine chains and transmits light polarized perpendicular to the blocks. Since iodine chains have two or more dimensions smaller than wavelengths of visible rays and have a great number of chains per a cube of ray wavelength, the optical-modulation object has the same optical properties as a mirror surface (specular), and diffusive transmission through the optical-modulation object or diffusive reflection from the surface of the optical-modulation object is very slight. Like most other commercially obtainable optical-modulation objects (See FIG. 1), such an optical-modulation object is based on selective absorption and reflection of polarized light.

Optical-modulation objects filled with inorganic inclusions exhibiting different properties provide different optical transmittance and reflectivity. For example, mica flakes having two or more dimensions larger than wavelengths of visible rays are incorporated into a polymer film and a paint, to impart metallic luster thereto. By designing the flakes to be present in the plane of the film, strong direction-dependency can be imparted to reflection behaviors.

The use of these effects enables production of safe screens that have a high reflectivity at a specific observation angle and have a transmittance at other observance angles. Large flakes rendering color (selective regular reflection) depending on the arrangement state of incident light are incorporated into films, to provide evidence of reflection (tampering). For this purpose, flakes present inside the films should be uniformly arranged.

However, optical films produced from polymers filled with the inorganic inclusions have a variety of disadvantages. Commonly, the adhesion between inorganic particles and a polymeric matrix is bad. Accordingly, optical properties of optical-modulation objects are deteriorated, when stress or deformation is alternately applied to the matrix. This is because the bond between the matrix and the inclusion may be damaged and hard inorganic inclusions may be broken. Additionally, further considerations are required in the process for arranging inorganic inclusions, thus complicating a production process.

However, both a matrix and an inclusion inserted into the same, which constitute conventional optical-modulation objects, are optically isotropic, thus disadvantageously causing deterioration in optical modulation efficiency. When birefringent fibers are arranged in a matrix, light emitted from a light source is reflect, scattered and refracted on the birefringent interface between the birefringent fiber and the isotropic matrix, thus inducing optical modulation and improving luminance. However, general birefringent fibers have advantages of low production costs and high optical modulation efficiency, but disadvantageously cannot improve luminance to a desired level and are unsuitable for application to industrial fields, instead of conventional optical-modulation objects comprising inclusions.

Therefore, the present invention has been made in view of the above problems, and it is an object of the present invention to provide an optical-modulation object comprising birefringent island-in-the-sea yarns designed to prevent aggregation of island portions and thus maximize optical modulation efficiency and a method for fabricating the same.

SUMMARY OF THE INVENTION

In accordance with the present invention, the above and other objects can be accomplished by the provision of an optical-modulation object including: a matrix; and a birefringent island-in-the-sea yarn arranged in the matrix, wherein the island-in-the-sea yarn includes island portions grouped based on two or more spinning cores.

The spinning cores may include one standard spinning core arranged in the center of the birefringent island-in-the-sea yarn and a plurality of peripheral spinning cores arranged based on the standard spinning core. Preferably, distances between the standard spinning core and the peripheral spinning cores may be substantially equivalent and the peripheral spinning cores may be spaced from one another by a uniform distance.

The peripheral spinning cores may be 3 to 20 in number and more preferably 6 to 10 in number.

The 10 to 300 island portions may be arranged with respect to the one standard spinning core or the one peripheral spinning core. The total number of the island portions may be 50 to 1,500, more preferably, 500 to 1,500, most preferably, 1,000 to 1,500.

The longitudinal cross-sections of grouped island portions may be arranged in the form of a circle or a polygon and in this case, the cross-section shapes of grouped island portions may be identical or different.

The spinning core may be arranged based on the center of the island-in-the-sea yarn, and more preferably, the spinning core may not be formed in the center of the island-in-the-sea yarn.

The number of the spinning cores may be 3 to 20 and more preferably, 6 to 10.

The single yarn fineness of the birefringent island-in-the-sea yarn may be 0.5 to 30 deniers and more preferably, 0.0001 to 1.0 deniers.

The island portions and sea portions may have different optical properties, and the island portions may be anisotropic and the sea portions may be isotropic.

The island portions may be selected from polyethylene naphthalate (PEN), copolyethylene naphthalate (co-PEN), polyethylene terephthalate (PET), polycarbonate (PC), polycarbonate (PC) alloys, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile (SAN) mixtures, ethylene vinyl acetate (EVA), polyamide (PA), polyacetal (POM), phenol, epoxy (EP), urea (UF), melanin (MF), unsaturated polyester (UP), silicon (Si), elastomers and cycloolefin polymers, and combinations thereof.

The sea portions may be selected from polyethylene naphthalate (PEN), copolyethylene naphthalate (co-PEN), polyethylene terephthalate (PET), polycarbonate (PC), polycarbonate (PC) alloys, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile (SAN) mixtures, ethylene vinyl acetate (EVA), polyamide (PA), polyacetal (POM), phenol, epoxy (EP), urea (UF) melanin (MF), unsaturated polyester (UP), silicon (SI), elastomers and cycloolefin polymers, and combinations thereof.

The difference in refractive index between the matrix and the island-in-the-sea yarn with respect to two axial directions may be 0.05 or less and a difference in refractive index between the matrix and the island-in-the-sea yarn with respect to the remaining one axial direction may be 0.1 or more.

Assuming that x-, y- and z-axis refractive indexes of the matrix are $nX1$, $nY1$ and $nZ1$, respectively, and the x-, y- and z-axis refractive indexes of the island-in-the-sea yarn are $nX2$, $nY2$ and $nZ2$, respectively, at least one of x-, y- and z-axis refractive indexes of the matrix may be equivalent to that of the birefringent island-in-the-sea yarn and the refractive indexes of the birefringent island-in-the-sea yarn may be $nX2 > nY2 = nZ2$.

The difference in refractive index between the sea portion and the island portion with respect to two axial directions may be 0.05 or less and a difference in refractive index between the sea portion and the island portion with respect to the remaining one axial direction may be 0.1 or more.

Assuming that x- (longitudinal), y- and z-axis refractive indexes of the island portion are $nX3$, $nY3$ and $nZ3$, respectively, and the x-, y- and z-axis refractive indexes of the sea portion are $nX4$, $nY4$ and $nZ4$, respectively, at least one of x-, y- and z-axis refractive indexes of the island portion may be equivalent to that of the sea portion, and an absolute value of the difference in refractive index between $nX3$ and $nX4$ may be 0.05 or more.

The refractive index of the sea portions in the island-in-the-sea yarns may be equivalent to the refractive index of the matrix.

The sea portions and the island portions may be present in an area ratio of 2:8 to 8:2, based on the transverse cross-section of the island-in-the-sea yarn.

The birefringent island-in-the-sea yarn may extend in a longitudinal direction.

The optical-modulation object may have a structured surface.

The birefringent island-in-the-sea yarn may include two or more groups of island portions arranged based on two or more spinning cores, wherein the maximum distance between the centers of adjacent island portions present in one group is smaller than the maximum distance between the centers of adjacent island portions present in adjacent two groups.

The birefringent island-in-the-sea yarn may be in the form of a fabric, the fabric may be woven using the birefringent island-in-the-sea yarn as one of weft and warp and an isotropic fiber as the other, and the island portions may have a melting initiation temperature higher than a melting temperature of the isotropic fiber.

The fiber may be an optically-isotropic fiber. Specifically, the fiber may be selected from the group consisting of polymer, natural and inorganic fibers, and combinations thereof.

The island portions may have a melting initiation temperature higher than a melting temperature of the isotropic fiber and the sea portions.

The fiber and/or island portions may be partially or entirely melted.

The weft or warp may be composed of 1 to 200 threads of the island-in-the-sea yarns.

In accordance with another aspect, provided is an optical modulation system including: a light source; and a birefringent island-in-the-sea yarn arranged on the light source, wherein the birefringent island-in-the-sea yarn including island portions grouped, based on two or more spinning cores is arranged in a matrix, to modulate light emitted from the light source and then emit the light.

Hereinafter, a brief description will be given of the terms used herein.

Unless specifically mentioned, the term "spinning core" means a specific point acting as a standard point at which island portions in island-in-the-sea yarns are grouped (partitioned), on the cross-section taken in a longitudinal direction.

The term "standard spinning core" means a spinning core acting as a center and the term "peripheral spinning core" means a remaining spinning core arranged based on the standard spinning core, when the spinning cores are in plural and are composed of one spinning core and other spinning cores arranged based on the one spinning core.

The expression "island portions are arranged such that they are grouped" means a state in which the island portions of island-in-the-sea yarns are arranged, based on one or more spinning cores, such that they are partitioned in a predetermined shape, and for example, when two spinning cores are present in island-in-the-sea yarns, the island-in-the-sea yarns are arranged in a predetermined shape, based on respective spinning cores and the island portions are thus divided into two groups in the island-in-the-sea yarns.

The expression "fibers are birefringent" means that when light is irradiated to fibers having different refractive indices according to directions, the light incident to the fibers is refracted in two different directions.

The term "isotrope" means a property in which an object has a constant refractive index irrespective of a direction in which light passes through the object.

The term "anisotrope" means a property in which optical properties of an object are varied according to directions of light and an anisotropic object is birefringent and is contrary to isotrope.

The term "optical modulation" means a phenomenon in which irradiated light is reflected, refracted, or scattered, or intensity, wave cycle or characteristics thereof are varied.

The term "melting initiation temperature" means a temperature at which a polymer begins to melt, and the term "melting temperature" means a temperature at which melting occurs most rapidly. Accordingly, when a melting temperature of a polymer is observed by DSC, the temperature at which melting endothermic peak initially takes place is referred to as a "melting initiation temperature" and the temperature plotted at a maximum of the endothermic peak is referred to as a "melting temperature".

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
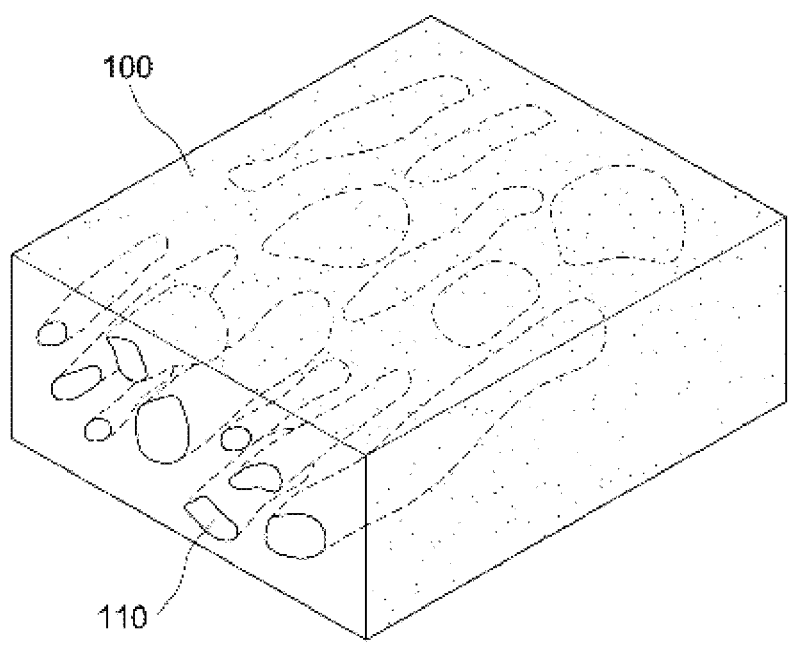
FIG. 1 is a perspective view illustrating a conventional optical-modulation object.

The present invention provides an optical-modulation object which comprises birefringent island-in-the-sea yarns whose island portions are grouped based on two or more spinning cores and causes formation of an optical modulation interface between the island portions and sea portions, and thus maximizing optical modulation efficiency, as compared to conventional birefringent island-in-the-sea yarns. The birefringent island-in-the-sea yarns of the present invention are free of aggregation of island portions in the center thereof, although the number of island portions is 500 or more. As a result, the birefringent island-in-the-sea yarns maximize an optical modulation interface area and thus considerably improve optical modulation efficiency, as compared to conventional birefringent island-in-the-sea yarns comprising one spinning core. Accordingly, the birefringent island-in-the-sea yarns advantageously exhibited considerably improved luminance, as compared to conventional birefringent island-in-the-sea yarns wherein only birefringent fibers or one spinning core are present in a matrix.

Hereinafter, the present invention will be illustrated in more detail.

Conventional optical-modulation objects have a disadvantage of low optical modulation efficiency, since both a matrix and an inclusion inserted into the same, which constitute conventional optical-modulation objects, are optically isotropic, When birefringent fibers are arranged in the matrix, light emitted from a light source is reflected, scattered and refracted on the birefringent interface between the birefringent fibers and the isotropic matrix, thus inducing optical modulation and improving luminance. However, general birefringent fibers have advantages of low production costs and high optical modulation efficiency, but disadvantageously cannot improve luminance to a desired level and are unsuitable for industrial applications, instead of optical-modulation objects comprising conventional inclusions.

Accordingly, the afore-mentioned problem can be solved by using birefringent island-in-the-sea yarns as birefringent fibers having a birefringent interface. More specifically, the case where birefringent island-in-the-sea yarns are used is found to exhibit considerably improved optical modulation efficiency and luminance, as compared to the case where conventional birefringent fibers are used. Of the constituent components of island-in-the-sea yarns, the island portions are anisotropic and sea portions partitioning the island portions are isotropic. This case, where the interfaces between a plurality of island portions and a plurality of sea portions constituting the island-in-the-sea yarns as well as the interfaces between the island-in-the-sea yarns and the matrix are birefringent, exhibits considerably improved optical modulation efficiency and is thus industrially applicable as an alternative to stack-type optical-modulation objects, as compared to conventional birefringent fibers wherein only the interfaces between the matrix and birefringent fibers are birefringent. Accordingly, as compared to the case where common birefringent fibers are used, the case where birefringent island-in-the-sea yarns are used exhibits superior optical modulation efficiency, and birefringent island-in-the-sea yarns which comprise island portions and sea portions exhibiting different optical properties, thus enabling formation of birefringent interfaces therein, can more considerably improve optical modulation efficiency.

Figure 2:
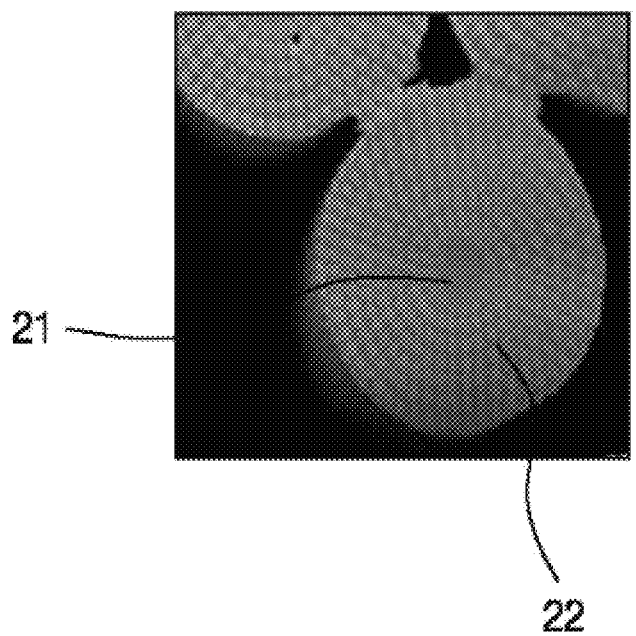
FIGS. 2 and 3 are electron micrographs illustrating the cross-section of a conventional island-in-the-sea yarn.
Figure 3:
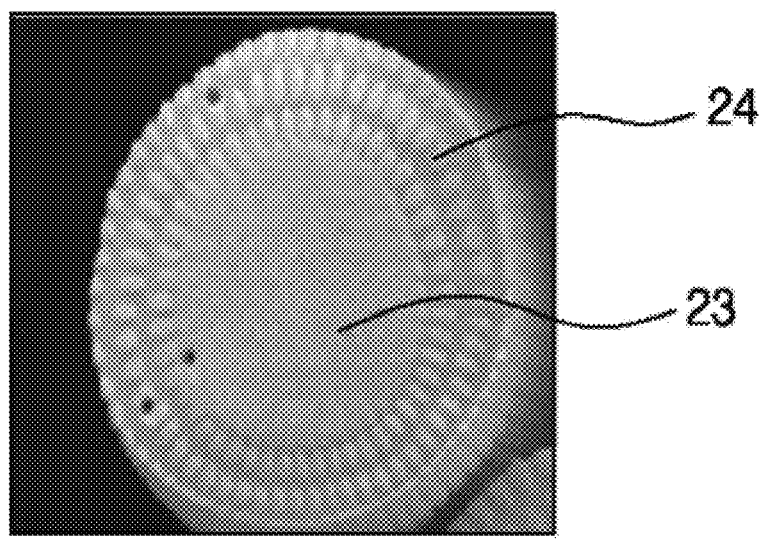

Meanwhile, in order to maximize optical modulation efficiency, it is preferred that an area of birefringent interface present in the birefringent island-in-the-sea yarns be wider. For this purpose, the number of island portions present in the birefringent island-in-the-sea yarns should be as large as possible. However, conventional island-in-the-sea yarns comprise island portions concentrically arranged based on one spinning core. This cross-sectional structure is normal, when island portions are small in number, while island portions adjacent to spinning cores formed in the center of island-in-the-sea yarns are highly dense and may be aggregated together (island-conjugation) during spinning, when island portions are large in number (about 300 or higher). More specifically, FIGS. 2 and 3 show cross-sections of conventional island-in-the-sea yarns comprising 331 island portions. In FIG. 2, island portions 22 are concentrically arranged based on one spinning core 21 in island-in-the-sea yarns and the island portions take 60 to 70% of the total cross-section of island-in-the-sea yarns. In FIG. 3, island portions 24 are also concentrically arranged based on one spinning core 23 in island-in-the-sea yarns and the island portions take 70 to 80% of the total cross-section of island-in-the-sea yarns. This cross-sectional structure is normal, when island portions are small in number, while island portions adjacent to spinning cores formed in the center of island-in-the-sea yarns are highly dense and may be aggregated during spinning, when island portions are large in number (about 300 or higher) or a cross-section area ratio of the island portions to the island-in-the-sea yarns increases. That is, as the number of island portions in island-in-the-sea yarns increases, an undesired side-effect (island-conjugation) in which island portions present in the center of island-in-the-sea yarns are aggregated and lumped may readily occur.

Accordingly, birefringent island-in-the-sea yarns having general cross-sections have a decreased birefringent interface due to the island conjugation phenomenon, as the number of island portions decreases, and cannot disadvantageously improve optical modulation efficiency to a desired level.

Accordingly, in an optical-modulation object according to one embodiment of the present invention, in an attempt to solve the afore-mentioned problem, birefringent island-in-the-sea yarns comprising island portions grouped based on two or more spinning cores are dispersed in a matrix. Consequently, the phenomenon in which island portions are excessively concentrated on one spinning core can be prevented and thus causes no island-conjugation. As a result, optical modulation efficiency and luminance are considerably improved.

Hereinafter, the present invention will be illustrated in more detail with reference to the annexed drawings.

Figure 4:
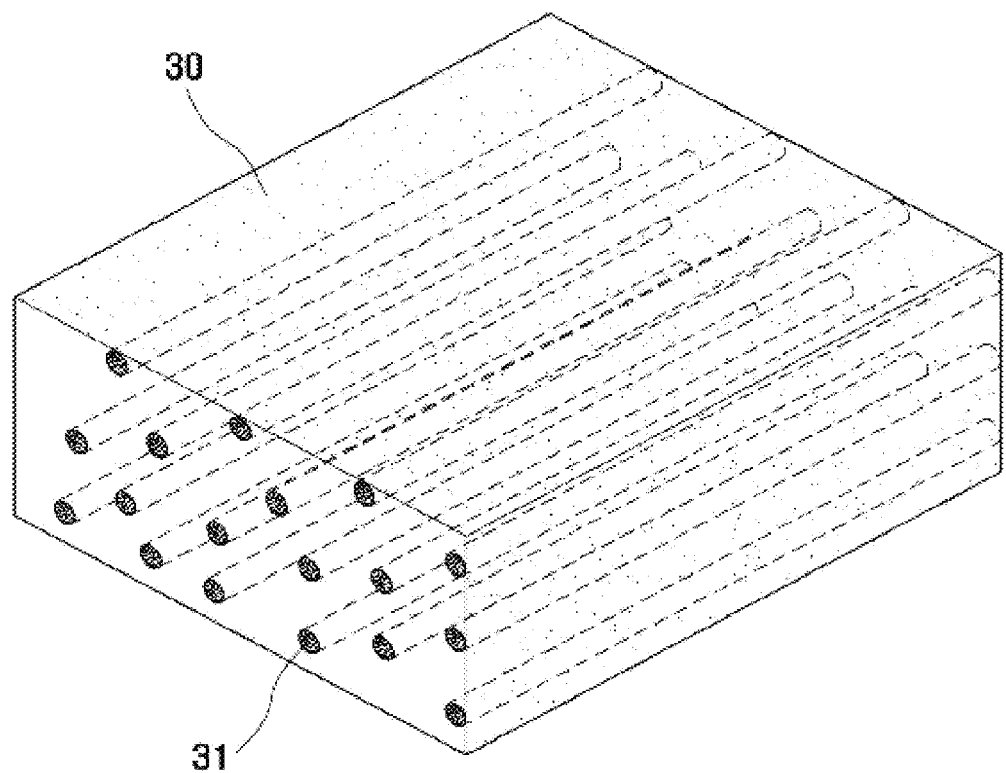
FIG. 4 is a schematic view illustrating a transverse cross-section of an optical-modulation object according to one embodiment of the present invention.

FIG. 4 is a schematic cross-sectional view illustrating an optical-modulation object according to the present invention. More specifically, an optical-modulation object has a structure in which birefringent island-in-the-sea yarns 31 are freely arranged within an isotropic matrix 30. Materials for the matrix 30 that can be used in the present invention include thermoplastic and thermosetting polymers which can transmit a desired range of optical wavelengths and may be a transparent material enabling easy transmission of light. Preferably, the matrix 30 may be amorphous or semicrystalline and may include a monopolymer, a copolymer or a blend thereof. More specifically, examples of suitable matrixes include poly(carbonate) (PC); syndiotactic and isotacticpoly(styrene) (PS); alkyl styrene; alkyl such as poly(methyl methacrylate) (PMMA) and PMMA copolymers, aromatic and aliphatic pendant (meth)acrylate; ethoxide and propoxide (meth)acrylate; multi-functional (meth)acrylate; acrylated epoxy; epoxy; and other ethylene unsaturated compounds; cyclic olefin and cyclic olefin copolymers; acrylonitrile butadiene styrene (ABS); styrene acrylonitrile (SAN) copolymers; epoxy; poly(vinyl cyclohexane); PMMA/poly(vinyl fluoride) blends; poly(phenylene oxide) alloys; styrene block copolymers; polyimide; polysulfone; poly(vinyl chloride); poly(dimethylsiloxane) (PDMS); polyurethane; unsaturated polyester; polyethylene; poly(propylene) (PP); poly(alkane terephthalate) such as poly(ethylene terephthalate) (PET); poly(alkane naphthalate) such as poly(etylene naphthalate) (PEN); polyamide; ionomers; vinyl acetate/polyethylene copolymers; cellulose acetate; cellulose acetate butyrate; fluoro polymers; poly(styrene)-poly(ethylene) copolymers; PET and PEN copolymers such as polyolefin PET and PEN; and poly(carbonate)/aliphatic PET blends. More preferably, examples of suitable matrixes include polyethylene naphthalate (PEN), copolyethylene naphthalate (co-PEN), polyethylene terephthalate (PET), polycarbonate (PC), polycarbonate (PC) alloys, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile (SAN) mixtures, ethylene vinyl acetate (EVA), polyamide (PA), polyacetal (POM), phenol, epoxy (EP), urea (UF), melanin (MF), non-saturated polyester (UP), silicon (Si), elastomers, cycloolefin polymers (COP, ZEON Co., Ltd. (Japan), JSR Co., Ltd. (Japan)) and combinations thereof. More preferably, the matrix 30 may be composed of the same material as the sea portion of birefringent island-in-the-sea yarns 31. Furthermore, the matrix 30 may also contain an additive, such as an antioxidant, a light stabilizer, a heat stabilizer, a lubricant, a dispersing agent, a UV absorber, white pigment, and a fluorescent whitening agent, so long as the additive does not damage physical properties as mentioned above.

Meanwhile, constituent components and optical properties of the matrix may be identical to those of the sea portions and/or the fibers, taking into consideration various physical properties. In this case, in the lamination process, the matrix may be partially or entirely melted, thus enabling improvement in adhesion between the birefringent island-in-the-sea yarns and the matrix without using additional adhesive. In addition, the matrix may include three layers. More specifically, the three layers may form a stack structure including a skin layer (B layer)/core layer (A layer)/skin layer (C layer). The thickness ratio between the skin layer and the core layer may be about 1:2, but is not limited thereto. The skin layer which corresponds to a fabric and is arranged outside the matrix may have the same melting temperature as the sea portions and/or the fibers, in order to improve the matrix and the birefringent island-in-the-sea yarns. The core layer may be made of a material which has a higher melting temperature than the sea portions and/or fibers, in order to prevent deformation of the matrix due to heat generated by a lamp.

Next, the birefringent island-in-the-sea yarns 31 included in the matrix 30 will be illustrated. As mentioned above, conventional island-in-the-sea yarns has a cross-section in which island portions are concentrically arranged on the basis of one spinning core. This cross-sectional structure is normal, when island portions are small in number, while island portions adjacent to spinning cores formed on the center of island-in-the-sea yarns are highly dense and may be aggregated during spinning, when island portions are large in number (about 300 or higher). That is, as the number of island portions of island-in-the-sea yarns increases, the island portions present at the center thereof are aggregated, thus decreasing the birefringent surface and limiting improvement in optical modulation, when used for optical-modulation objects.

Accordingly, in the birefringent island-in-the-sea yarns according to one embodiment of the present invention which comprise a plurality of island portions and sea portions surrounding the island portions, the problem can be solved by arranging the island portions such that they are grouped based on two or more spinning cores. As a result, the phenomenon in which island portions are excessively concentrated on one spinning core can be prevented.

Figure 5:
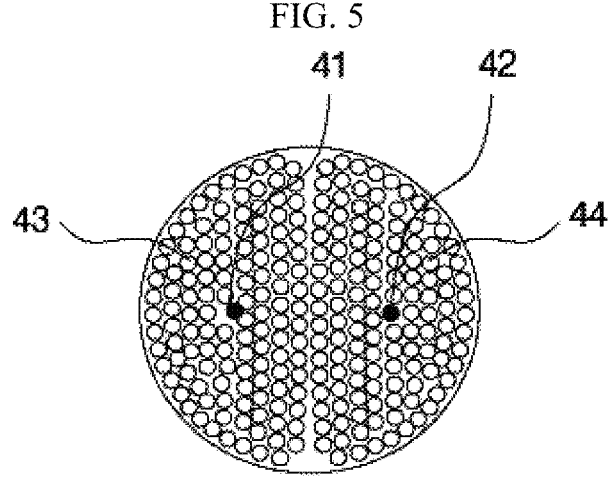
FIG. 5 is a cross-sectional view illustrating grouped island-in-the-sea yarns according to one preferred embodiment of the present invention.
Figure 6:
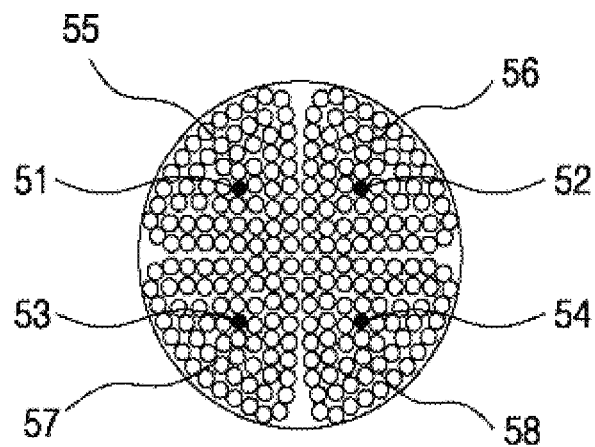
FIG. 6 is a cross-sectional view illustrating grouped island-in-the-sea yarns according to another preferred embodiment of the present invention.

FIG. 5 is a sectional view illustrating a birefringent island-in-the-sea yarn according to a preferred embodiment of the present invention. Two spinning cores 41 and 42 are formed in an island-in-the-sea yarn 40 and island portions 43 and 44 are arranged such that they are grouped based on the spinning cores 41 and 42. That is, island portions 43 and 44 are arranged such that they are partitioned based on the respective spinning cores 41 and 42. As a result, as can be seen from the cross-section of the island-in-the-sea yarn 40, the number of groups of island portions partitioned is equivalent to the number of spinning cores. In this case, respective groups of the island portions 43 and 44 arranged based on the spinning cores 41 and 42 may have a cross-sectional shape such as a semicircle, a sector, a circle, a spheroid, a polygon or variant thereof, and their shapes are not particularly restricted and may be identical or different. For example, FIG. 6 is a sectional view illustrating a case wherein four spinning cores 51, 52, 53 and 54 are present in an island-in-the-sea yarn 50. The arrangement shape of island portions 55, 56, 57, 58 is a sector, as shown in FIG. 6, but a part thereof may be in the form of a triangle, a tetragon or a circle. Meanwhile, in the drawings, each spinning core is represented by a thick black dot, which is shown for clearer description purpose only, and means one point acting as an actual center of the groups and the point may be either island portion or sea portion. Furthermore, spaces present in the island-in-the-sea yarns may be actually filled with island portions, or the island-in-the-sea yarn may be composed of only sea portions.

Meanwhile, the total number of island portions present in the birefringent island-in-the-sea yarn may be 38 to 1,500, more preferably, 500 to 1,500 and most preferably, 1,000 to 1,500, when the number of spinning cores is suitably controlled. Furthermore, the number of the island portions arranged in each spinning core may be 10 to 300, more preferably, 100 to 150 and is not limited thereto. Consequently, the number of island portions arranged adjacent to each spinning core may be suitably controlled under the conditions that the island portions are not aggregated and fineness of island-in-the-sea yarns and island portions, fineness of desired microfibers and optical modulation efficiency, as mentioned below, are maximized.

Figure 7:
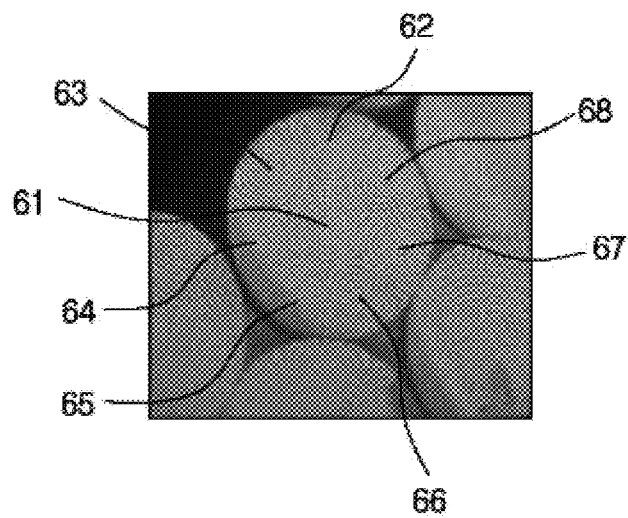
FIG. 7 is an electron micrograph illustrating grouped island-in-the-sea yarns according to another preferred embodiment of the present invention.

In accordance with a preferred first embodiment, the spinning cores may include a standard spinning core arranged in the center of the island-in-the-sea yarns and a plurality of peripheral spinning cores arranged based on the standard spinning core. More specifically, FIG. 7 shows an example of the birefringent island-in-the-sea yarns 60 according to the first embodiment of the present invention, and the birefringent island-in-the-sea yarns 60 include a standard spinning core 61 arranged in the center thereof and seven peripheral spinning cores 62 to 68 arranged based on the standard spinning core 61. In this case, preferably, the distances between the standard spinning core 61 and the peripheral spinning cores 62 to 68 may be substantially uniform or not. When the longitudinal cross-section of the island-in-the-sea yarns has a circular shape, it is preferred that the distance between the standard spinning core 61 and the peripheral spinning cores 62 to 68 be substantially uniform, in order to efficiently minimize aggregation of the island portions. On the other hand, when the longitudinal cross-section of the island-in-the-sea yarns has a spheroidal shape, it is preferred that the standard spinning core 61 and the plurality of peripheral spinning cores 62 to 68 are formed such that the distances between the standard spinning core 61 and the peripheral spinning cores 62 to 68 are long in an longer axis direction of the spheroid, but are short in a short axis direction thereof.

Meanwhile, the number of peripheral spinning cores may be preferably 3 to 20, more specifically, 6 to 10. As shown in FIG. 7, the most superior effects can be obtained, when the number of peripheral spinning cores 62 to 68 arranged based on one standard spinning core 61 be 6 to 8 and the number of grouped island portions in the standard spinning core 61 and peripheral spinning cores 62 to 68 be 100 to 200 (Table 1).

Figure 8:
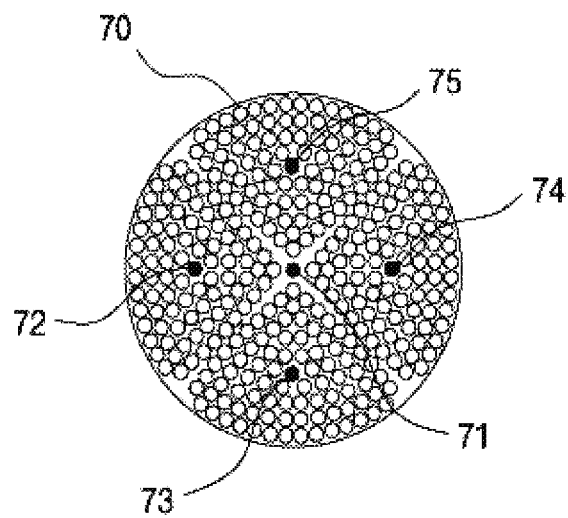
FIG. 8 is a cross-sectional view illustrating grouped island-in-the-sea yarns according to another preferred embodiment of the present invention.
Figure 9:
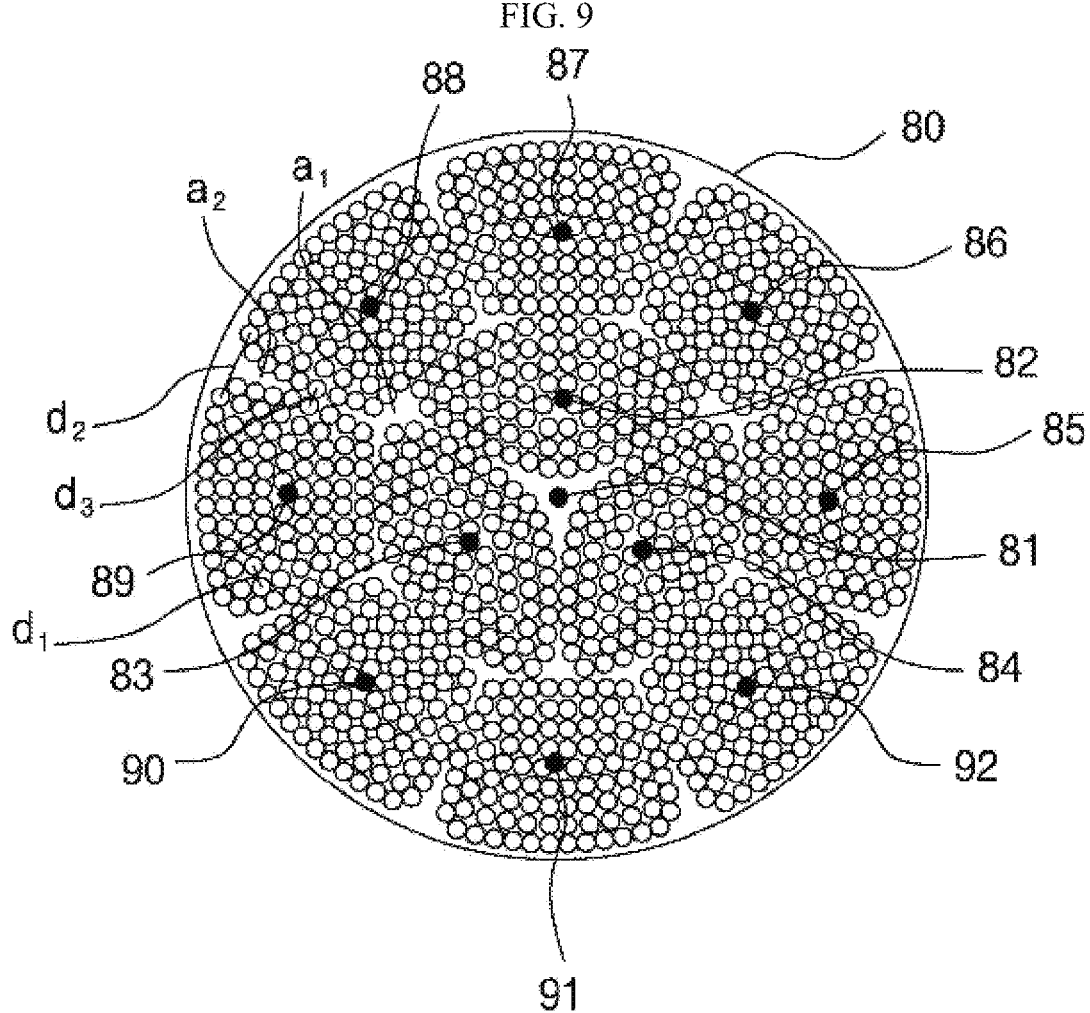
FIG. 9 is a cross-sectional view illustrating grouped island-in-the-sea yarns according to another preferred embodiment of the present invention.

In accordance with a preferred second embodiment of the present invention, the island-in-the-sea yarns comprise one or more spinning cores arranged in the center thereof, and more preferably, the island-in-the-sea yarns may comprise no spinning core in the center thereof. Hereinafter, only distinguishing characteristics of the second embodiment are described, except description associated with the matrix. More specifically, FIG. 8 shows an example of the birefringent island-in-the-sea yarns 60 according to the second embodiment of the present invention, and in FIG. 8, spinning cores 72, 73, 74 and 75 are arranged based on a center 71 of the birefringent island-in-the-sea yarns, but no spinning core is formed in the center 71. FIG. 9 shows an example wherein three spinning cores 82, 83 and 84 arranged, based on a center 81 of island-in-the-sea yarns, and eight spinning cores 85, 86, 87, 88, 89, 90, 91, 92 are formed outside the spinning cores 82, 83 and 84. Both the three spinning cores 82, 83 and 84 arranged in an inner region, and eight spinning cores 85, 86, 87, 88, 89, 90, 91 and 92 arranged outside the inner spinning cores 82, 83 and 84 are based on the center 81 of the island-in-the-sea yarns. In this case, the number of spinning cores is preferably 3 to 20, more preferably 6 to 10, and is not limited thereto.

Meanwhile, as shown in FIG. 9, the birefringent island-in-the-sea yarns according to the present invention may have a maximum distance between the centers of adjacent island portions present in one group, which is smaller than a maximum distance between the centers of adjacent island portions in two adjacent groups. More specifically, as shown in FIG. 9, the closest distance $d_3$ and the farthest distance $d_2$ exist between the centers of adjacent island portions present in different groups. In this case, the maximum distance $d_1$ between the centers of adjacent island portions present in one group may be smaller than $d_2$. As a result, spaces $a_1$ and $a_2$ are formed by the separation between adjacent groups. That is, the birefringent island-in-the-sea yarns have non-uniform distances between two adjacent groups and the maximum distance between the centers of adjacent island portions forming the boundary between adjacent groups (the maximum distance between the centers of adjacent island portions present in two adjacent groups) is larger than the maximum distance between the centers of adjacent island portions present in one group. Accordingly, the case where only the shape of island portions is varied, which is simple repetition of patterns and cannot thus escape from island conjugation, is not included in partitioned groups according to the present invention.

Meanwhile, group-type island-in-the-sea yarns used in the present invention will be sufficient, when they have a fineness comparable to single yarn fineness of common island-in-the-sea yarns and preferably have a single yarn fineness of 0.5 to 30 deniers. Of the island-in-the-sea yarns, island portions preferably have a single yarn fineness of 0.0001 to 1.0 deniers, in view of efficient accomplishment of objects of the present invention.

In the birefringent island-in-the-sea yarns according to another embodiment of the present invention, the island portions and sea portions may have different optical properties in order to maximize optical modulation efficiency, and more preferably, the island portions may be anisotropic and the sea portions may be isotropic.

Figure 10:
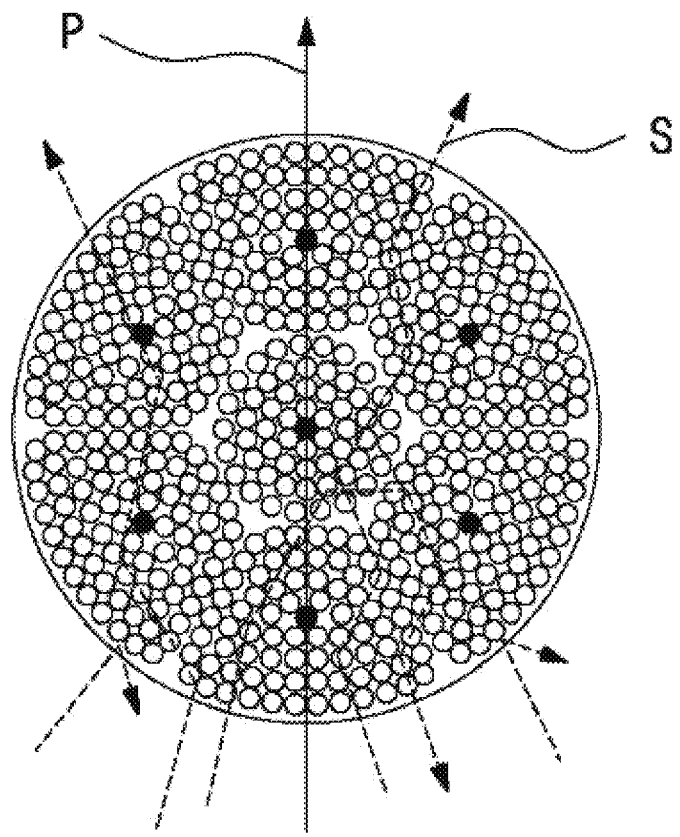
FIG. 10 is a cross-sectional view illustrating a passage of light emitted to the birefringent island-in-the-sea yarns.

More specifically, in island-in-the-sea yarns comprising optically isotropic sea portions and anisotropic island portions, the levels of substantial equality and in-equality between refractive indexes along spatial axes X, Y and Z affect scattering of polarized light. Generally, scattering performance varies in proportion to the square of the difference in refractive index. Accordingly, as the difference in refractive index according to a specific axis increases, light polarized according to the axis is more strongly scattered. On the other hand, when the difference in refractive index according to a specific axis is low, a ray of light polarized according to the axis is weakly scattered. When the refractive index of sea portions at a specific axis is substantially equivalent to the refractive index of island portions, incident light that is polarized by an electric field parallel to this axis is not scattered, irrespective of the size, shape and density of a portion of the island-in-the-sea yarns, but may pass through the island-inthe-sea yarns. More specifically, FIG. 10 is a sectional view illustrating a passage in which light permeates birefringent island-in-the-sea yarns of the present invention. In this case, p waves (represented by lines) transmit island-in-the-sea yarns, independent from the interface between the outside and the birefringent island-in-the-sea yarns and the interface between island portions and sea portions present in birefringent island-in-the-sea yarns, while S waves (represented by dots) are affected by the interface between the matrix and the birefringent island-in-the-sea yarns and/or the interface between island portions and sea portions in the birefringent island-in-the-sea yarns and are thus optically modulated.

The afore-mentioned optical modulation phenomenon often occurs on the interface between the matrix and the birefringent island-in-the-sea yarns and the interface between island portions and sea portions in the birefringent island-in-the-sea yarns. More specifically, optical modulation occurs on the interface between the matrix and the birefringent island-in-the-sea yarn, like common birefringent fibers, when the matrix is optically isotropic. Specifically, the difference in refractive index between the matrix and the island-in-the-sea yarn with respect to two axial directions may be 0.05 or less and the difference in refractive index between the matrix and the island-in-the-sea yarn with respect to the remaining axial direction may be 0.1 or more. Assuming that x-, y- and z-axis refractive indexes of the matrix are $nX1$, $nY1$ and $nZ1$, respectively, and the x-, y- and z-axis refractive indexes of the island-in-the-sea yarn are $nX2$, $nY2$ and $nZ2$, respectively, at least one of x-, y- and z-axis refractive indexes of the matrix may be equivalent to that of the birefringent island-in-the-sea yarn and the refractive indexes of island-in-the-sea yarns may be $nX2>nY2=nZ2$.

Meanwhile, of the birefringent island-in-the-sea yarns, the island portions and the sea portions preferably have different optical properties in view of formation of the birefringent surface. More specifically, when the island portions are anisotropic and the sea portions are isotropic, birefringent interfaces may be formed on the boundaries therebetween, and more specifically, it is preferred that the difference in refractive index in two axes is 0.05 or less and the difference in refractive index in the remaining axis is 0.1 or more. In this case, P waves pass through birefringent interfaces of island-in-the-sea yarns, while S waves cause optical modulation. More specifically, assuming that x-(longitudinal), y- and z-axis refractive indexes of the island portion are $nX3$, $nY3$ and $nZ3$, respectively, and the x-, y- and z-axis refractive indexes of the sea portion are $nX4$, $nY4$ and $nZ4$, respectively, it is preferred that at least one of x-, y- and z-axis refractive indexes of the island portion be equivalent to that of the sea portion and an absolute value of the difference in refractive index between $nX3$ and $nX4$ be 0.05 or more. Most preferably, when the difference in refractive index between sea portions and island portions in island-in-the-sea yarns in a longitudinal direction is 0.1 or more and with respect to the remaining two axis directions, the refractive index of the sea portion is substantially equivalent to that of the island portion, optical modulation efficiency can be maximized. Meanwhile, the case wherein the matrix and sea portions in the birefringent island-in-the-sea yarns have identical refractive indexes is advantageous for improving optical modulation efficiency.

Consequently, as mentioned above, to maximize optical modulation efficiency of the island-in-the-sea yarns, the island portions and sea portions should have different optical properties and have a wide area of optical modulation interfaces. For this purpose, the number of island portions should be increased, and preferably, the number of island portions should be greater than 500. However, in conventional island-in-the-sea yarns, when island portions are 500 or more in number, although island portions have an anisotropic refractive index and sea portions have an isotropic refractive index, they may be aggregated, thus disadvantageously causing a decrease in optical modulation interface area and deterioration in optical modulation efficiency. As described in the preceding embodiment of the present invention, in the case where two or more spinning cores are formed and 500 or more (preferably, 1,000 or more) island portions are arranged, aggregation of island portions can be prevented. As a result, optical modulation efficiency of island-in-the-sea yarns is maximized and optical modulation effects and great improvement in luminance can be thus expected, when the birefringent island-in-the-sea yarns according to embodiments of the present invention are incorporated into the optical-modulation object.

Examples of sea portions and/or island portions that can be used in the present invention include polyethylene naphthalate (PEN), copolyethylene naphthalate (co-PEN), polyethylene terephthalate (PET), polycarbonate (PC), polycarbonate (PC) alloys, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), poly vinyl chloride (PVC), styrene acrylonitrile (SAN) mixtures, ethylene vinyl acetate (EVA), polyamide (PA), polyacetal (POM), phenol, epoxy (EP), urea (UF), melanin (MF), non-saturated polyester (UP), silicon (Si), elastomers and cycloolefin polymers and combinations thereof. In view of efficient improvement in optical modulation, it is preferable to adopt materials for the island portions and the sea portions which have substantially identical refractive indexes in two axes, but have great difference in refractive index in one axis. However, it is more preferable that when polyethylene naphthalate (PEN) is used as a material for island portions in the birefringent island-in-the-sea yarns 31 and a copolyethylene naphthalate and polycarbonate alloy alone or a combination thereof is used as a material for sea portions, luminance is greatly improved, as compared to birefringent island-in-the-sea yarns made of common materials. In particular, when the polycarbonate alloy is used as the sea portions, birefringent island-in-the-sea yarns with the most excellent optical modulation property can be prepared. In this case, the polycarbonate alloy may be preferably composed of polycarbonate and modified glycol poly cyclohexylene dimethylene terephthalate (PCTG) and more preferably, use of the polycarbonate alloy consisting of the polycarbonate and modified glycol poly cyclohexylene dimethylene terephthalate (PCTG) which are present in a weight ratio of 15:85 to 85:15 is effective for improvement in luminance. When polycarbonate is present in an amount less than 15%, polymer viscosity required for spinning performance is excessively increased and use of a spinning machine is disadvantageously impossible, and when the polycarbonate is present in an amount exceeding 85%, a glass transition temperature increases and spinning tension increases, after discharge from a nozzle, thus making it difficult to secure spinning performance.

Most preferably, use of the polycarbonate alloy consisting of the polycarbonate and modified glycol poly cyclohexylene dimethylene terephthalate (PCTG) which are present in a weight ratio of 4:6 to 6:4 is effective for improvement in luminance. Furthermore, in view of efficient improvement in optical modulation efficiency, it is preferable to adopt materials for the island portions and the sea portions which have substantially identical refractive indexes in two axes, but have great difference in refractive index in one axis.

Meanwhile, methods for modifying isotropic materials into birefringent materials are well-known in the art and for example, polymeric molecules are oriented and materials thus become birefringent when they are drawn under suitable temperature conditions.

In view of efficient improvement in optical modulation efficiency, it is preferable to adopt materials for the island portions and the sea portions which have substantially identical refractive indexes in two axes, but have great difference in refractive index in one axis.

Meanwhile, the birefringent island-in-the-sea yarns are arranged in the form of yarns or a fabric in the matrix. First, in the case where birefringent island-in-the-sea yarns are arranged in the form of yarns in the matrix, a plurality of birefringent island-in-the-sea yarns may preferably extend in one direction, and more preferably, the island-in-the-sea yarns may be arranged in the matrix vertically to a light source. In this case, optical modulation efficiency is maximized. Meanwhile, the island-in-the-sea yarns arranged in a row may be dispersed from one another, if appropriate, and the birefringent island-in-the-sea yarns may come in contact with one another or may be separated from one another. In the case where the island-in-the-sea yarns contact one another, they are close together to form a layer. For example, when three or more types of island-in-the-sea yarns, whose cross-sections have different diameters and are circular, are arranged, a triangle, which is obtained by interconnecting the centers of three circles adjacent to one another in the cross-sections perpendicular to their long axial directions, becomes a scalene. In addition, in the cross-sections taken perpendicular to the long axial directions of the island-in-the-sea yarns (cylindrical bodies), the cylindrical bodies are arranged such that the circle in a first layer contacts the circle in a second layer, the circle in the second layer contacts the circle in a third layer and the following layer contacts the next layer adjacent thereto. However, the condition that respective island-in-the-sea yarns contact two or more other island-in-the-sea yarns, which contact one another on the sides of their cylinders, on the side of the cylinder has only to be satisfied. Under this condition, a structure, in which the circle in the first layer contacts the circle in the second layer, the circle in the second layer and the circle in the third layer are spaced apart from each other through a support medium interposed therebetween, and the circle in the third layer contacts the circle in a fourth layer, may be designed.

It is preferred that the lengths of at least two sides of a triangle, which connects the centers of three circles directly contacting each other in the cross-sections perpendicular to the long axial direction of the island-in-the-sea yarn, be approximately identical. In particular, it is preferred that the lengths of three sides of the triangle be approximately identical. Further, in relation to a stack state of island-in-the-sea yarns in a thickness direction of the optical-modulation object, it is preferred that a plurality of layers be stacked such that two adjacent layers sequentially contact each other. Furthermore, it is more preferred that island-in-the-sea yarns in the form of cylinders having a substantially identical diameter be densely filled.

Accordingly, in such a more-preferred embodiment, the island-in-the-sea yarns have a cylindrical shape in which the diameters of circular cross-sections perpendicular to their long axial direction are substantially identical, and island-in-the-sea yarns located more inwardly than the outermost surface layer in the cross-section contact six other cylindrical island-in-the-sea yarns on the side of the cylinder.

Figure 11:
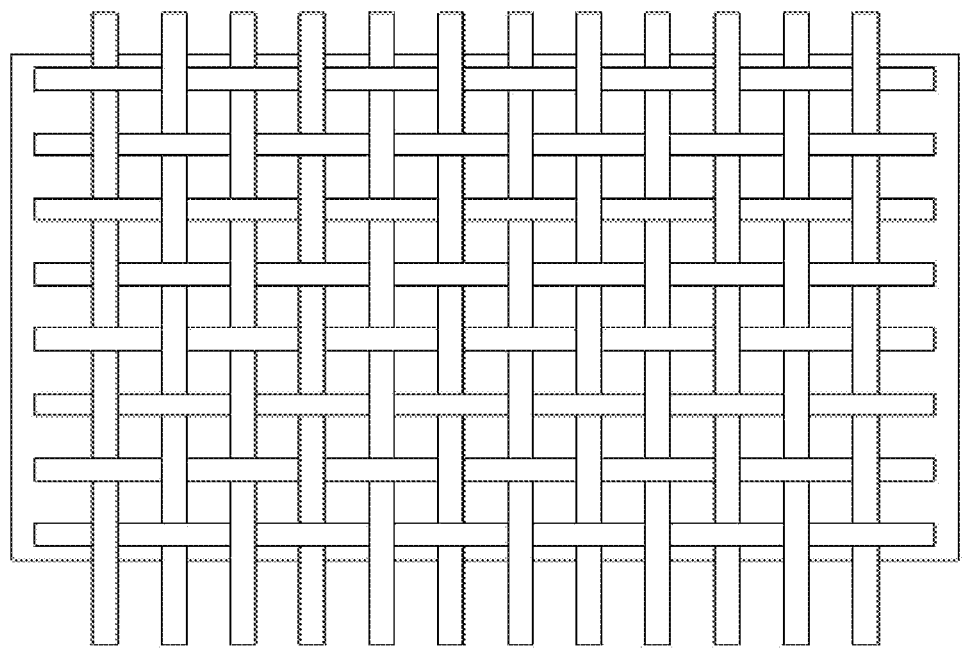
FIG. 11 shows a fabric woven using the birefringent island-in-the-sea yarns according to the present invention as wefts and/or warps.

Meanwhile, the birefringent island-in-the-sea yarns may be arranged in the form of fabrics in the matrix, as shown in FIG. 11. In this case, provided is a fabric comprising the birefringent island-in-the-sea yarns of the present invention as wefts and/or warps, and more preferably, provided is a fabric wherein the birefringent island-in-the-sea yarns of the present invention are used as one of wefts and warps and isotropic fibers are used as the other. Preferably, the wefts or warps may be formed of 1 to 200 threads of birefringent island-in-the-sea yarns and the fibers may be partially or entirely melted. More specifically, a melting initiation temperature of the island portions may be higher than (more preferably, 30° C. higher than) the melting temperature of the isotropic fibers and/or the sea portions. For example, in the case where the melting initiation temperature of the island portions is 230° C., the melting temperature of the sea portions is 142° C., the melting temperature of the isotropic fibers is 142° C., the lamination of the fabric woven using these materials to a matrix interposed therebetween through applying predetermined heat and pressure to the matrix is carried out at a temperature of 150° C., the lamination temperature is higher than the melting initiation temperature of the sea portions, and the fibers and sea-portions are thus partially or entirely melted, while the island portions are not melted. Accordingly, when the lamination is carried out at a temperature between the melting initiation temperature of island-portions and the melting temperature of the fibers, the fibers are melted and removed, thus solving the phenomenon of the optical-modulation object comprising the same, foreign property of isotropic fibers (appearance of the fibers). In addition, the fibers and sea-portions are thus partially or entirely melted, thus eliminating the necessity of using additional adhesive to adhere the fabric to the matrix. Any fibers may be used without limitation as to type, so long as they are woven with the birefringent island-in-the-sea yarns to form a fabric and meet the afore-mentioned temperature conditions. Preferably, the fibers may be optically isotropic, when taking into consideration the fact that they are perpendicularly woven with the birefringent island-in-the-sea yarns. This is because when the fibers are also birefringent, light modulated through birefringent island-in-the-sea yarns may pass through the fibers. Examples of fibers that can be used include polymer, natural and inorganic fibers (such as glass fibers), and combinations thereof. More specifically, the fibers may be the same material as the sea-portions.

Meanwhile, it is preferable that the birefringent island-in-the-sea yarns have a volume of 1% to 90% with respect to the optical-modulation object of 1 cm$^3$. When the volume of the island-in-the-sea yarn is 1% or less, a luminance-reinforcement effect is slight. When the volume of the island-in-the-sea yarn exceeds 90%, the amount of scattering increases due to the birefringent interface, disadvantageously causing optical loss.

Furthermore, the number of the birefringent island-in-the-sea yarns arranged in the optical-modulation object of 1 cm$^3$ may 500 to 4,000,000. The island portions in the birefringent island-in-the-sea yarns may greatly affect optical modulation. When the cross-sectional diameter of each island portion in birefringent island-in-the-sea yarns is smaller than optical wavelengths, refraction, scattering and reflection effects are decreased and optical modulation hardly occur. When the cross-sectional diameter of each island portion is excessively large, light is regularly reflected from the surface of island-in-the-sea yarns and diffusion in other directions is considerably slight. The cross-sectional diameters of island portions may be varied depending on an intended application of optical bodies. For example, the diameter of fibers may be varied depending on electromagnetic radiation wavelengths important for specific applications and different diameters of fibers are required to reflect, scatter or transmit visible, ultraviolet and infrared rays and microwaves.

Meanwhile, in a preferred embodiment of the present invention, the optical-modulation object of the present invention may have a surface layer structured thereon, and more specifically, the structured surface layer may be formed on the side from which light is emitted. The structured surface layer may be in the form of a prism, lenticular or convex lens. More specifically, the side on the optical-modulation object from which light is emitted may have a curved surface in the form of a convex lens. The curved surface may focus or defocus light permeated into the curved surface. Also, the light-emitting surface may have a prism pattern.

Figure 12:
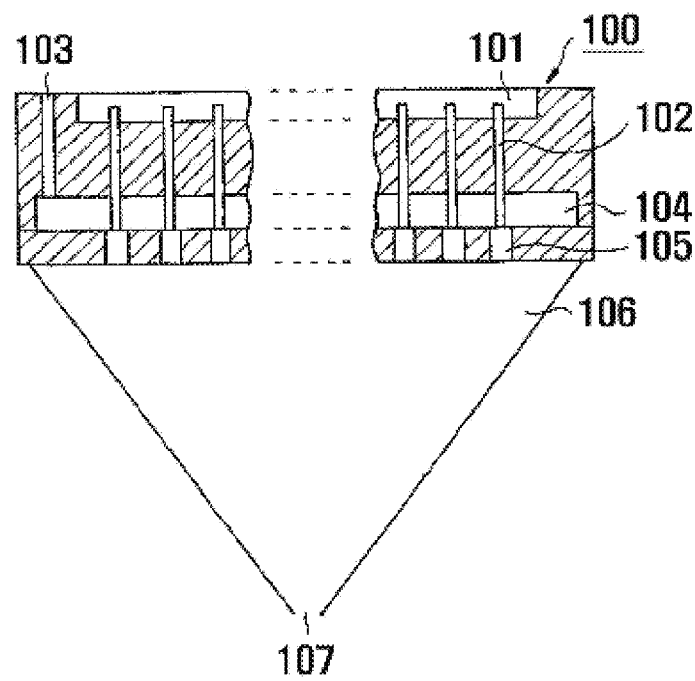
FIGS. 12 and 13 are cross-sectional views illustrating a part of a spinneret according to a preferred embodiment of the present invention.
Figure 13:
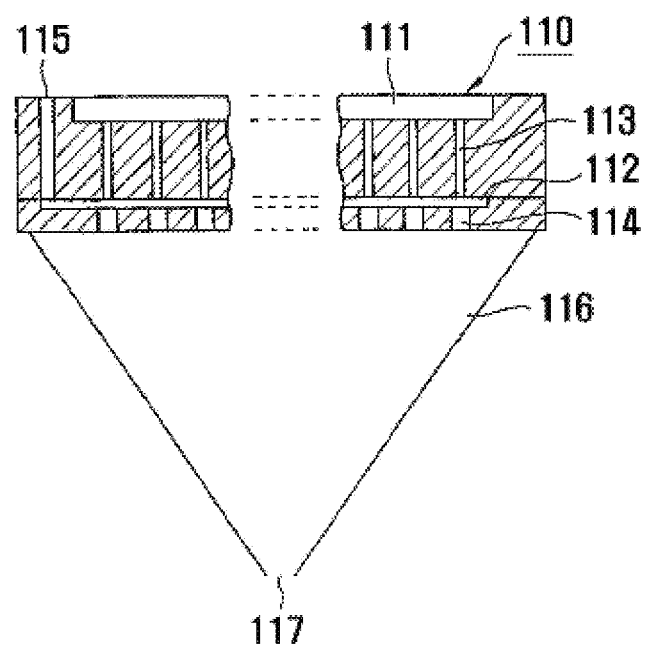

Next, a method for preparing birefringent island-in-the-sea yarns according to the present invention will be described. The birefringent island-in-the-sea yarns may be applied to any general method for preparing island-in-the-sea yarns without particular limitation. Any spinneret or spinning nozzle may be used without restriction of shape so long as it enables preparation of birefringent island-in-the-sea yarns. Spinnerets or spinning nozzles having the substantially identical shape to the arrangement pattern of island portions on the cross-sections of birefringent island-in-the-sea yarns may be generally used. More specifically, any spinneret may be used so long as it can form island-in-the-sea yarns by combining island ingredients extruded from hollow pins or spinning nozzles suitably designed to partition island portions therein with a sea ingredient stream supplied from channels designed to fill the spaces provided therebetween, and extruding the combined stream from a discharge hole, while gradually thinning the stream, and island-in-the-sea yarns have two or more spinning centers. An example of spinnerets suitable for use is shown in FIGS. 12 and 13, and spinnerets that can be used in the present invention are not necessarily restricted thereto. The birefringent island-in-the-sea yarns of the present invention may be prepared using the spinneret disclosed in Korean Patent Application No. 2009-12138.

More specifically, FIG. 12 shows an example of a spinneret suitable for use in the present invention. More specifically, in the spinneret 100, a (melted) polymer for an island ingredient, present in an island-ingredient polymer storage 101 before being dispensed, is distributed through a plurality of hollow pins into a plurality of island-ingredient polymer channels 102, while a (melted) polymer for a sea ingredient is introduced through a plurality of sea-ingredient polymer channels 103 into a sea-ingredient polymer storage 104 before being dispensed. Each hollow pin constituting the island-ingredient polymer channels 102 passes through the sea-ingredient polymer storage 104 and opens downward with respect to the inlet center of a plurality of core-shell type combined-stream channels 105 arranged thereunder. The island-ingredient polymer streams are supplied from the bottom of island-ingredient polymer channels 102 to the center of core-shell type combined-stream channels 105, and the sea-ingredient polymer streams present in the sea-ingredient polymer storage 104 are introduced such that they surrounds the island-ingredient polymer streams present in the core-shell type combined-stream channels 105, to form a combined stream including the island-ingredient polymer streams as cores and the sea-ingredient polymer streams as shells. At this time, the cores are arranged such that they are grouped, based on two or more spinning centers. The core-shell type combined-streams are introduced into a combined-stream channel 106 having a funnel shape and the shells of core-shell type combined-streams present in the combined-stream channel 106 are then combined to form a sea-island type combined-stream. The sea-island type combined-stream is discharged from a discharge hole 107 arranged on the bottom of the funnel-shaped combined-stream channel 106, while flowing through the funnel-shaped combined-stream channel 106 and having a gradually-decreased horizontal cross-section.

FIG. 13 is an example of another preferred spinneret 110. For the spinneret 110, an island-ingredient polymer storage 111 is connected to a sea-ingredient polymer storage 112 through island-ingredient polymer channels 113 including a plurality of holes, the island-ingredient polymer (melted) present in the island-ingredient polymer storage 111 is distributed through a plurality of island-ingredient polymer channels 113 and is then introduced into a sea-ingredient polymer storage 112. Meanwhile, the sea-ingredient polymer is introduced through a sea-ingredient polymer channel 115 into a sea-ingredient polymer storage 112. Meanwhile, the island-ingredient polymer introduced into the sea-ingredient polymer storage 112 passes through the sea-ingredient polymer (melted) accepted in the sea-ingredient polymer storage 112, is then introduced into core-shell type combined-stream channels 114 and flows downward in the center thereof. Meanwhile, the sea-ingredient polymer present in the sea-ingredient polymer storage 112 flows downward such that it surrounds the island-ingredient polymer streaming downward through the center of the core-shell type combined-stream channels 114. As a result, a plurality of core-shell type combined-streams are formed in a plurality of core-shell type combined-stream channels 114 and then flows downward in a funnel shape combined-stream channel 116. As a result, like the spinneret as shown in FIG. 12, sea-island type combined streams are formed, flow downward and are then discharged from a discharge hole 117 arranged on the bottom of a funnel-shaped combined-stream channel 106, while having a gradually-decreased horizontal cross-section. Finally, birefringent island-in-the-sea yarns of the present invention are prepared.

Consequently, the birefringent island-in-the-sea yarns of the present invention, unlike common island-in-the-sea yarns, are free of aggregation of island portions, thus enabling arrangement of 1,000 or more of the island portions and formation of a great number of refractive surfaces, thereby being effective for improvement in optical modulation efficiency and enhancement in luminance.

Furthermore, in the case where a composite fiber is prepared by twisting several to several tens of island-in-the-sea yarns, for example, a composite fiber is prepared by twisting 10 island-in-the-sea yarns, the composite fiber has 100 birefringent interfaces and thus causes at least 100 times of optical modulation. Furthermore, in the case where island-in-the-sea yarns composed of several threads are prepared, for example, island-in-the-sea yarns composed of 10 threads, the composite fiber prepared from the yarns has 100 birefringent interfaces and thus causes at least 100 times of optical modulation. The island-in-the-sea yarns of the present invention may be prepared by a method such as co-extrusion, although not limited thereto.

Accordingly, while conventional island-in-the-sea yarns utilize only island portions left behind after melting sea portions, as microfibers, irrespective of birefringency, the present invention utilizes island-in-the-sea yarns comprising sea portions and island portions having different optical properties, instead of melting the sea portions of island-in-the-sea yarns. In order to accomplish objects of the present invention, the present invention adopts the case where island portions are anisotropic and sea portions are isotropic and vice versa.

Hereinafter, the following Examples and Experimental Examples will be provided for a further understanding of the invention. These examples are for illustrative purposes only and are not intended to limit the scope of the present invention.

EXAMPLE 1

An isotropic PC alloy consisting of polycarbonate and modified glycol poly cyclohexylene dimethylene terephthalate (PCTG) in a ratio of 5:5 was used as a sea ingredient (nx=1.57, ny=1.57, nz=1.57) and anisotropic PEN (nx=1.88, ny=1.57, nz=1.57) was used as an island ingredient. In order to obtain island-in-the-sea yarns having the cross-section shown in FIG. 5, these materials were placed on a spinneret having the same cross-section as the island-in-the-sea yarns. Under this composition, undrawn yarns 150/24 were spun at a spinning temperature of 305° C. and at a spinning rate of 1,500 M/min and then drawn 3-fold to obtain 50/24 drawn yarns. For the grouped island-in-the-sea yarns thus prepared as shown in FIG. 5, 200 groups consisting of 100 island portions are arranged in each of two spinning cores. An island-in-the-sea yarn fabric was woven using 24 threads of the island-in-the-sea yarns thus prepared as wefts and using general isotropic polyester fibers as warps. Then, the island-in-the-sea yarn fabric was placed on the space between two PC alloy sheets made of the same material as the sea portions of the birefringent island-in-the-sea yarns and was compressed with a predetermined pressure to laminate the island-in-the-sea yarn-woven fabric to the PC alloy sheets. Then, a mixed UV-curable coating resin of epoxy acrylate and urethane acrylate having a refractive index of 1.54 was coated on the fabric-laminated PC alloy sheets and a region in which a mirror surface roll is introduced, and was primarily and secondarily UV cured to prepare a composite sheet on which birefringent island-in-the-sea yarns are laminated. The coating resin had a refractive index of 1.54 before UV coating curing, while it had a refractive index of 1.57 after curing. An optical-modulation object with a thickness of 400 μm was fabricated.

EXAMPLE 2

An optical-modulation object was fabricated in the same manner as in Example 1 except that birefringent island-in-the-sea yarns, whose cross-section corresponds to that of FIG. 7, and wherein 130 island portions are arranged in one spinning core and the total number of island portions is thus 1040, were used.

EXAMPLE 3

An optical-modulation object was fabricated in the same manner as in Example 1 except that birefringent island-in-the-sea yarns, whose cross-section corresponds to that of FIG. 9, and wherein 100 island portions are arranged in one spinning core and the total number of island portions is thus 1100, were used.

COMPARATIVE EXAMPLE 1

An optical-modulation object with a thickness of 400 μm was fabricated in the same manner as in Example 1 except that birefringent island-in-the-sea yarns whose island portions are isotropic PET (nx=ny=nz=1.57) and whose sea portions are isotropic Co-PEN (nx=ny=nz=1.57), and have a cross-section corresponding to that of FIG. 5 were used.

COMPARATIVE EXAMPLE 2

A PEN resin of IV 0.53 was polymerized to prepare raw yarns of undrawn yarns 150/24, instead of the birefringent island-in-the-sea yarns used in Example 1. At this time, the yarns were spun at a spinning temperature of 305° C. and a spinning rate of 1,500 M/min. The obtained undrawn yarns were drawn three-fold at a temperature of 150 r to prepare 50/24 drawn yarns. The PEN fibers showed birefrigence and had refractive indices of nx=1.88, ny=1.57 and nz=1.57 in respective directions. An optical-modulation object with a thickness of 400 μm was fabricated in the same manner as Example 1 except that the birefrigence PEN fibers were used, instead of the island-in-the-sea yarns of Example 1.

COMPARATIVE EXAMPLE 3

An optical-modulation object was fabricated in the same manner as in Example 1 except that island-in-the-sea yarns including one spinning core and 200 island portions arranged based on the spinning core, as shown in FIG. 2, were used instead of birefringent island-in-the-sea yarns in Example 1.

COMPARATIVE EXAMPLE 4

An optical-modulation object was fabricated in the same manner as in Example 1 except that island-in-the-sea yarns including one spinning core and 500 island portions arranged based on the spinning core, as shown in FIG. 3, were used instead of birefringent island-in-the-sea yarns in Example 1.

EXPERIMENTAL EXAMPLE

The following physical properties of the optical-modulation objects fabricated in Example 1 to 3 and Comparative Example 1 to 4 were evaluated and the results thus obtained are shown in Table 1 below.

1. Luminance

The following tests were performed, in order to measure the luminance of the optical-modulation objects thus fabricated. A panel was assembled on a 32" direct lighting type backlight unit provided with a diffusion plate, two diffusion sheets, and the optical-modulation object, and luminance at 9 points was measured using a BM-7 tester (TOPCON, Corp. Korea), and an average luminance value was obtained and shown.

2. Transmittance

Transmittance was measured in accordance with ASTM D1003 using a COH300A analyzer (NIPPON DENSHOKU Co., Ltd. Japan).

3. Degree of Polarization

The degree of polarization was measured using an RETS-100 analyzer (OTSKA Co., Ltd., Japan).

4. Moisture absorption

The optical-modulation object was immersed in water at 23° C. for 24 hours in accordance with ASTM D570 and variation in sample wt % before and after treatment was measured.

5. Sheet Sprout

The optical-modulation object was assembled in a 32-inch backlight unit, stood in a thermo-hygrostat at RH 75%, 60° C. for 96 hours and then disassembled. A sprout level of the optical-modulation object was observed with the naked eye and the results thus obtained were marked by ○, Δ or x.

○: Good, Δ: Normal, x: Bad

6. UV-Resistance

The optical-modulation object was irradiated using a 130-mW ultraviolet lamp (365 nm) at a height of 10 cm using SMDT51H (SEI MYUNG VACTRON CO., LTD. Korea) for 10 minutes. Yellow index (YI) before and after treatment was measured using an SD-5000 analyzer (NIPPON DEN-SHOKU Co., Japan) and a yellowing level was thus evaluated.

TABLE 1

|  | Luminance (cd/m²) | Transmittance (%) | Degree of polarization (%) | Moisture absorption (%) | Sheet sprout | UV-resistance |
|---|---|---|---|---|---|---|
| Ex. 1 | 400 | 52 | 78 | 0.24 | ○ | 2.3 |
| Ex. 2 | 420 | 48 | 80 | 0.24 | ○ | 2.0 |
| Ex. 3 | 420 | 48 | 80 | 0.24 | ○ | 2.0 |
| Comp. Ex. 1 | 290 | 85 | 5 | 0.24 | ○ | 1.5 |
| Comp. Ex. 2 | 320 | 55 | 50 | 0.24 | ○ | 1.8 |
| Comp. Ex. 3 | 380 | 58 | 70 | 0.24 | ○ | 2.0 |
| Comp. Ex. 4 | 390 | 56 | 72 | 0.24 | ○ | 2.0 |

As can be seen from Table 1, optical-modulation objects comprising the birefringent island-in-the-sea yarns (Examples 1 to 3) according to the present invention exhibited superior overall optical properties, as compared to optical-modulation objects not comprising birefringent island-in-the-sea yarns (Comparative Examples 1 to 4). In particular, the case where island-in-the-sea yarns having the same cross-section as that of FIG. 7 was used in Example 2 exhibited the most excellent effects.

Meanwhile, as can be seen from Comparative Example 1, the case where island portions and sea portions exhibited identical optical properties, although the cross-section of birefringent island-in-the-sea yarns of the present invention was adopted, enhancement in luminance was hardly obtained. In the case where the cross-section of conventional island-in-the-sea yarns including one spinning core was adopted, although island portions and sea portions have different optical properties, also exhibited low optical properties. From these results, it can be confirmed that the case where island portions and sea portions have different optical properties and the cross-section of birefringent island-in-the-sea yarns according to the present invention is adopted exhibited considerably excellent optical properties.

The optical-modulation object of the present invention exhibits superior optical modulation performance and may thus be widely utilized in fields requiring optical modulation. More specifically, the optical-modulation object may be widely used in optical devices such as cameras and microscopes, automobile exteriors, cellular phones, and flat panel displays including high luminance-requiring liquid crystal displays (LCDs), projection displays, plasma display panels (PDPs), field emission displays (FEDs), LEDs and electroluminescent displays (ELDs).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An optical-modulation object for modulating light incident on a light incident surface of the optical-modulation object and emitting the light to the light incident surface of the optical-modulation object and/or an opposite surface of the optical-modulation object, the optical-modulation object comprising:
a matrix; and
a birefringent island-in-the-sea yarn arranged in the matrix,
wherein the birefringent island-in-the-sea yarn comprises two or more groups of island portions arranged based on two or more spinning cores,
wherein the island portions, which form one group, form spaced layers comprising three or more layers based on the spinning cores,
wherein a maximum distance between the centers of adjacent island portions present in one group is smaller than a maximum distance between the centers of adjacent island portions present in two adjacent groups, and
wherein spaced spaces are present between all adjacent groups, and the spaced spaces are sea components.

2. The optical-modulation object according to claim 1, wherein the spinning cores include one standard spinning core arranged in the center of the birefringent island-in-the-sea yarn and a plurality of peripheral spinning cores arranged based on the standard spinning core.

3. The optical-modulation object according to claim 2, wherein the peripheral spinning cores are 3 to 20 in number.

4. The optical-modulation object according to claim 2, wherein the peripheral spinning cores are 6 to 10 in number.

5. The optical-modulation object according to claim 2, wherein the number of island portions arranged with respect to one standard spinning core or one peripheral spinning core is 10 to 300.

6. The optical-modulation object according to claim 1, wherein the number of the island portions, which forms the one group, is 100 to 300.

7. The optical-modulation object according to claim 1, wherein the total number of the island portions is 500 to 1,500.

8. The optical-modulation object according to claim 2, wherein the total number of the island portions is 1,000 to 1,500.

9. The optical-modulation object according to claim 1, wherein the spinning cores are arranged based on the center of the birefringent island-in-the-sea yarn.

10. The optical-modulation object according to claim 9, wherein spinning cores are not formed in the center of the birefringent island-in-the-sea yarn.

11. The optical-modulation object according to claim 9, wherein the number of the spinning cores is 6 to 10.

12. The optical-modulation object according to claim 1, wherein a birefringent interface is formed on the boundary between the island portions and sea portions present in the birefringent island-in-the-sea yarn.

13. The optical-modulation object according to claim 12, wherein the island portions are anisotropic and the sea portions are isotropic.

14. The optical-modulation object according to claim 1, wherein the matrix is isotropic.

15. The optical-modulation object according to claim 1, wherein a difference in refractive index between the matrix and the island-in-the-sea yarn with respect to two axial directions is 0.05 or less and a difference in refractive index between the matrix and the island-in-the-sea yarn with respect to the remaining one axial direction is 0.1 or more.

16. The optical-modulation object according to claim 1, wherein assuming that x-, y- and z-axis refractive indexes of the matrix are nX1, nY1 and nZ1, respectively, and the x-, y- and z-axis refractive indexes of the island-in-the-sea yarn are nX2, nY2 and nZ2, respectively, at least one of x-, y- and z-axis refractive indexes of the matrix is equivalent to that of the birefringent island-in-the-sea yarn.

17. The optical-modulation object according to claim 16, wherein the refractive indexes of the birefringent island-in-the-sea yarn are nX2>nY2=nZ2.

18. The optical-modulation object according to claim 1, wherein a difference in refractive index between the sea portion and the island portion with respect to two axial directions is 0.05 or less and a difference in refractive index between the sea portion and the island portion with respect to the remaining one axial direction is 0.1 or more.

19. The optical-modulation object according to claim 1, wherein assuming that x- (longitudinal), y- and z-axis refractive indexes of the island portion are nX3, nY3 and nZ3, respectively, and the x-, y- and z-axis refractive indexes of the sea portion are nX4, nY4 and nZ4, respectively, at least one of x-, y- and z-axis refractive indexes of the island portion is equivalent to that of the sea portion.

20. The optical-modulation object according to claim 19, wherein an absolute value of the difference in refractive index between nX3 and nX4 is 0.1 or more.

21. The optical-modulation object according to claim 1, wherein the refractive index of the sea portions in the island-in-the-sea yarns is equivalent to the refractive index of the matrix.

22. The optical-modulation object according to claim 1, wherein the birefringent island-in-the-sea yarn is in the form of a fabric, wherein the fabric is woven using the birefringent island-in-the-sea yarn as one of weft and warp and an isotropic fiber as the other, and the island portions have a melting initiation temperature higher than a melting temperature of the isotropic fiber.

23. The optical-modulation object according to claim 22, wherein the fiber is an optically-isotropic fiber.

24. The optical-modulation object according to claim 22, wherein the fiber is selected from the group consisting of polymer, natural and inorganic fibers, and combinations thereof.

25. The optical-modulation object according to claim 22, wherein the island portions have a melting initiation temperature higher than a melting temperature of the sea portion and the sea portions.

26. The optical-modulation object according to claim 22, wherein at least one of the fiber and island portions is partially or entirely melted.

* * * * *